(12) United States Patent
Ziolek et al.

(10) Patent No.: US 10,351,029 B2
(45) Date of Patent: Jul. 16, 2019

(54) THERMAL WAVE-BASED SEAT HEATING

(71) Applicants: Hyundai America Technical Center, Inc., Superior Township, MI (US); Hyundai Motor Company, Seoul (KR); Kia Motors Corporation, Seoul (KR)

(72) Inventors: Scott Ziolek, Ann Arbor, MI (US); Amanda Christiana, Ann Arbor, MI (US)

(73) Assignees: Hyundai America Technical Center, Inc., Superior Township, MI (US); Hyundai Motor Company, Seoul (KR); Kia Motors Corporation, Seoul (KR)

(*) Notice: Subject to any disclaimer, the term of this patent is extended or adjusted under 35 U.S.C. 154(b) by 656 days.

(21) Appl. No.: 14/703,530

(22) Filed: May 4, 2015

(65) Prior Publication Data
US 2016/0325656 A1    Nov. 10, 2016

(51) Int. Cl.
B60N 2/56    (2006.01)

(52) U.S. Cl.
CPC .................. B60N 2/5685 (2013.01)

(58) Field of Classification Search
CPC ...... H05B 1/0238; H05B 1/0236; H05B 3/34; H05B 2203/029; A47C 7/748; B60N 2/5635; B60N 2/5657; B60N 2/5692; B60N 2/5678; B60N 2/56; B60H 1/00285
USPC .................. 219/202, 494, 217, 492
See application file for complete search history.

(56) References Cited

U.S. PATENT DOCUMENTS

| | | | |
|---|---|---|---|
| 6,237,675 B1 | 5/2001 | Oehring et al. | |
| 7,274,007 B2 | 9/2007 | Fernandez et al. | |
| 2004/0011778 A1* | 1/2004 | Fristedt | B60N 2/5685 219/217 |
| 2006/0196864 A1* | 9/2006 | Horiyama | B60N 2/5685 219/202 |
| 2009/0121524 A1 | 5/2009 | Abe et al. | |
| 2012/0234815 A1* | 9/2012 | Willey | B60N 2/5685 219/202 |
| 2013/0134150 A1* | 5/2013 | Mizuno | B60N 2/5685 219/492 |

(Continued)

FOREIGN PATENT DOCUMENTS

| | | |
|---|---|---|
| JP | 06-234318 | 8/1994 |
| JP | 2006-513078 A | 4/2006 |
| JP | 2015-047379 A | 3/2015 |

*Primary Examiner* — Ibrahime A Abraham
*Assistant Examiner* — Biniam B Asmelash
(74) *Attorney, Agent, or Firm* — Mintz Levin Cohn Ferris Glovsky and Popeo, P.C.; Peter F. Corless

(57) ABSTRACT

A method includes: establishing a dynamic target temperature range for a seat of a vehicle having a seat heating unit installed therein, the dynamic target temperature range defined by an adjustable minimum and maximum target temperature; activating a seat heating mode of multiple predefined seat heating modes based on an interior climate of the vehicle; defining the minimum target temperature and the maximum target temperature according to the activated seat heating mode; and controlling the seat heating unit such that a temperature of the seat continuously oscillates within the defined minimum target temperature and the defined maximum target temperature.

20 Claims, 7 Drawing Sheets

(56) References Cited

U.S. PATENT DOCUMENTS

| | | | |
|---|---|---|---|
| 2014/0110489 A1* | 4/2014 | Yasui | F02N 11/0833 237/5 |
| 2014/0197155 A1 | 7/2014 | Takahashi et al. | |

* cited by examiner

| Seat Heater Example | Interior Trigger Temp | Seat Temperature Targets (Target Tolerance = +/-1C) | | | | | | Seat Temp Change Time Limit |
|---|---|---|---|---|---|---|---|---|
| | | High | | Medium | | Low | | |
| | | $T_{MAX}$ | $T_{MIN}$ | $T_{MAX}$ | $T_{MIN}$ | $T_{MAX}$ | $T_{MIN}$ | |
| 1st Mode: Seat Warming Mode | <10C | 43C | 39C | 39C | 36C | 36C | 34C | < 1 sec |
| 2nd Mode: Thermal Sensation Mode | <15C | 43C | 38C | 38C | 37C | 36C | 34C | < 3 sec |
| 3rd Mode: Energy Saving Mode | >20C | 42C | 38C | 38C | 35C | 35C | 32C | < 6 sec |

THERMAL WAVE-BASED SEAT HEATING

BACKGROUND (a) Technical Field

The present disclosure relates generally to vehicular seat temperature control systems, and more particularly, to thermal wave-based seat heating.

(b) Background Art

Heated seats were once considered a luxury item in vehicles, but in recent times their implementation in has become increasingly commonplace. Vehicle seat heaters typically utilize a heating coil placed beneath the seat cover of the vehicle. The heating coil, which acts as a resistor, includes a long element of wire through which electricity passes. The heating coil resists the electricity flowing therethrough. Consequently, the resistance causes friction that is released in the form of heat.

A typical seat heater is controlled by a relay that, when activated (e.g., by pressing a button), allows a small electric current to flow through a coil in the relay. When current flows through the coil, a magnetic field is created, which closes a nearby switch. This completes a circuit and sends electricity from the vehicle's battery to the seat heater.

Various techniques have been adopted to control the temperature of the seat. For instance, a thermostat can be installed within the seat cover to monitor the heat output. Once the thermostat senses that the seat has reached a target temperature, the thermostat sends a signal, automatically turning off the relay until the seat cools down. When the seat has cooled down sufficiently, the thermostat can trigger circuit elements to re-activate the seat heater. In this manner, the seat heater cycles on and off to keep the temperature of the seat within a tolerable range of the target temperature. In some cases, the target temperature can be controlled or modified through direct user feedback or other sensor feedback-based methods. For instance, a user can select a seat heating level (e.g., "high" or "low") by pressing buttons on a steering wheel or seat bracket.

Notably, various studies have shown that human thermal sensation adapts to static thermal conditions. In the case of temperature, human sensation of heat is relatively lessened when exposed to a single, non-changing temperature. Conversely, human thermal sensation can be enhanced in response to a continually oscillating temperature (e.g., by delivering waves of heat or cool to the user), thereby producing a "thermal wave" effect. Therefore, thermal sensation and comfort can be enhanced by oscillating the temperature of a vehicle seat.

SUMMARY OF THE DISCLOSURE

The present disclosure provides techniques for controlling a vehicle seat heating unit using intentional oscillations within a dynamically changing temperature range defined by two or more (including 3, 4, 5 or 6 or more) independently controlled temperature values (each with its own tolerance range). In particular, minimum and maximum temperature points can be defined for the seat temperature to oscillate between. Additional temperature points can be defined to customize the waveform of the seat temperature oscillations. Furthermore, multiple seat heating modes can be established based on changes in the interior climate of the vehicle (i.e., trigger events). This way, the dynamic temperature range can change as the interior climate of the vehicle approaches the user's target temperature. Increased energy conservation also occurs when ambient conditions are more favorable (e.g., once the HVAC system has conditioned the vehicle cabin) by increasing the time between oscillations and adjusting the upper and lower temperature targets.

According to embodiments of the present disclosure, a method includes: establishing a dynamic target temperature range for a seat of a vehicle having a seat heating unit installed therein, the dynamic target temperature range defined by an adjustable minimum and maximum target temperature; activating a seat heating mode of multiple predefined seat heating modes based on an interior climate of the vehicle; defining the minimum target temperature and the maximum target temperature according to the activated seat heating mode; and controlling the seat heating unit such that a temperature of the seat continuously oscillates within the defined minimum target temperature and the defined maximum target temperature.

The method may further include: activating a second seat heating mode of the multiple seat heating modes in response to a change of the interior climate of the vehicle; and adjusting at least one of the minimum target temperature and the maximum target temperature according to the second seat heating mode.

The minimum target temperature and the maximum target temperature may have a corresponding tolerance range, respectively.

The minimum target temperature may be a lower limit of the tolerance range corresponding to the minimum target temperature, and the maximum target temperature may be an upper limit of the tolerance range corresponding to the maximum target temperature.

The method may further include: sensing an attribute of the interior climate of the vehicle. The sensed attribute may involve an interior temperature or an interior humidity of the vehicle.

The method may further include: activating a second seat heating mode of the multiple seat heating modes when the attribute of the interior climate of the vehicle satisfies a predefined trigger condition.

The predefined trigger condition may be satisfied when a value of the attribute of the interior climate of the vehicle is greater than or equal to a predefined value.

The method may further include: activating a second, third, fourth, fifth or sixth or more seat heating mode of the multiple seat heating modes when the attribute of the interior climate of the vehicle satisfies a predefined trigger condition. Again, the predefined trigger condition may be satisfied when a value of the attribute of the interior climate of the vehicle is greater than or equal to a predefined value.

The multiple seat heating modes may correspond to a unique dynamic target temperature range, respectively.

The multiple seat heating modes may include: a first seat heating mode in which the minimum target temperature and the maximum target temperature are substantially equivalent to a target temperature for the seat of the vehicle, a second seat heating mode in which the maximum target temperature is substantially equivalent to the target temperature, and the minimum target temperature is less than the maximum target temperature, and a third seat heating mode in which the maximum target temperature is less than the target temperature, and the minimum target temperature is less than the maximum target temperature.

The method may further include: controlling a waveform of temperature oscillations of the seat.

The controlling of the waveform may include: defining a heating duration and a cooling duration; and controlling the seat heating unit such that the temperature of the seat continuously oscillates by i) increasing toward the maximum target temperature for the heating duration and ii) decreasing toward the minimum target temperature for the cooling duration.

The cooling duration may be greater than the heating duration.

The controlling of the waveform may include: defining an intermediate target temperatures within the dynamic target temperature range; and controlling the seat heating unit such that the temperature of the seat continuously oscillates by i) increasing toward the maximum target temperature, ii) decreasing toward the intermediate target temperature, and iii) decreasing from the intermediate target temperature toward the minimum target temperature.

The controlling of the waveform may include: defining an intermediate target temperatures within the dynamic target temperature range; and controlling the seat heating unit such that the temperature of the seat continuously oscillates by i) increasing toward the intermediate target temperature, ii) increasing from the intermediate target temperature toward the maximum target temperature, and iii) decreasing toward the minimum target temperature.

The method may further include: defining one or more intermediate target temperatures within the dynamic target temperature range; and controlling the seat heating unit such that the temperature of the seat continuously oscillates according to the one or more intermediate target temperatures.

The method may further include: determining a target temperature for the seat of the vehicle.

The target temperature may be determined based on input received from a user of the vehicle.

The method may further include: initially establishing the dynamic target temperature range with respect to the target temperature.

The minimum target temperature and the maximum target temperature may be defined as substantially equivalent to the target temperature when the dynamic target temperature range is initially established.

The temperature of the seat may be a surface temperature of the seat.

Furthermore, according to embodiments of the present disclosure, a system includes: a seat heating unit installed in a seat of a vehicle and configured to deliver heat to the seat; a climate sensor sensing an interior climate of the vehicle; and a controller configured to i) establish a dynamic target temperature range for the seat of the vehicle, the dynamic target temperature range defined by an adjustable minimum and maximum target temperature, ii) activate a seat heating mode of multiple predefined seat heating modes based on the sensed interior climate of the vehicle, iii) define the minimum target temperature and the maximum target temperature according to the activated seat heating mode, and iv) control the seat heating unit such that a temperature of the seat continuously oscillates within the defined minimum target temperature and the defined maximum target temperature.

Furthermore, according to embodiments of the present disclosure, a non-transitory computer readable medium containing program instructions for performing a method includes: program instructions that establish a dynamic target temperature range for a seat of a vehicle having a seat heating unit installed therein, the dynamic target temperature range defined by an adjustable minimum and maximum target temperature; program instructions that activate a seat heating mode of multiple predefined seat heating modes based on an interior climate of the vehicle; program instructions that define the minimum target temperature and the maximum target temperature according to the activated seat heating mode; and program instructions that control the seat heating unit such that a temperature of the seat continuously oscillates within the defined minimum target temperature and the defined maximum target temperature.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 3 illustrates an example table of values associated with thermal wave-based seat heating modes;

Figure 1:
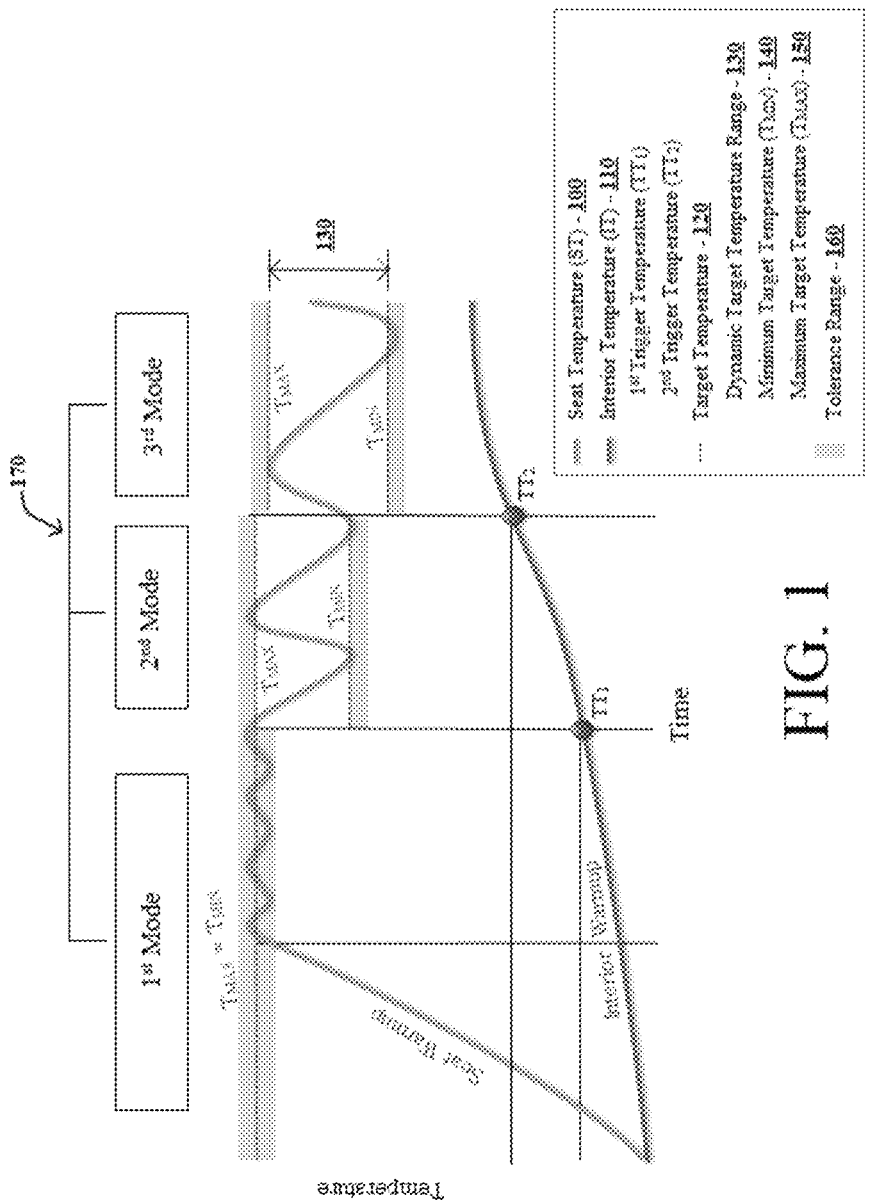
FIG. 1 illustrates an example graphical representation of operating a thermal wave-based seat heating system.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another or indirectly connected via one or more intermediary components.

It is understood that the term "vehicle" or "vehicular" or other similar term as used herein is inclusive of motor vehicles, in general, such as passenger automobiles including sports utility vehicles (SUV), buses, trucks, various commercial vehicles, watercraft including a variety of boats and ships, aircraft, and the like, and includes hybrid vehicles, electric vehicles, hybrid electric vehicles, hydrogen-powered vehicles and other alternative fuel vehicles (e.g., fuels derived from resources other than petroleum). As referred to herein, an electric vehicle (EV) is a vehicle that includes, as part of its locomotion capabilities, electrical power derived from a chargeable energy storage device (e.g., one or more rechargeable electrochemical cells or other type of battery). An EV is not limited to an automobile and may include motorcycles, carts, scooters, and the like. Furthermore, a hybrid vehicle is a vehicle that has two or more sources of power, for example both gasoline-based power and electric-based power (e.g., a hybrid electric vehicle (HEV)). Along the same lines, the term "user" may encompass any person including, but not limited to a driver, a passenger, and the like.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by a system comprising the controller in conjunction with one or more additional components, as described in detail below.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Referring now to embodiments of the present disclosure, the disclosed techniques allow for a vehicle seat heater that uses controlled oscillations between multiple independently controlled temperature targets, including a minimum target temperature, maximum target temperature, and one or more intermediate target temperatures. Oscillating the seat temperature is important because human thermal receptors adapt and become desensitized to static thermal conditions. Delivering waves of temperature creates a continuously changing thermal condition where the receptors do not become desensitized. In this regard, FIG. 1 illustrates an example graphical representation of operating a thermal wave-based seat heating system. As shown in FIG. 1, the temperature 100 of a seat in a vehicle having a seat heating unit installed therein increases upon activating the seat heating unit. The seat temperature 100 may refer to a surface temperature of the seat. The seat temperature 100 may warm up to a target temperature 120. The target temperature 120 may be determined based on input received from a user of the vehicle, for example. Or the target temperature 120 may be determined based on settings of the seat heating unit.

Simultaneously, an interior climate of the vehicle may be monitored. For example, one or more temperature sensors may sense the temperature 110 of the interior cabin of the vehicle. In a scenario where the engine of the vehicle has just been started, the interior temperature 110 may increase, as shown in FIG. 1. It may be desirable, therefore, to define the minimum target temperature 140 and maximum target temperature 150 of the vehicle seat based on the interior climate of the vehicle, and to adjust one or more of the minimum target temperature 140 and maximum target temperature 150 in response to a change of the interior climate. In this regard, one or more trigger temperatures, such as $TT_1$ and $TT_2$, as shown in FIG. 1, may be defined. Usage of trigger temperatures (e.g., $TT_1$ and $TT_2$) is described in further detail below.

As the temperature 100 of the seat nears or reaches the target temperature 120, the seat heating unit can be controlled such that the seat temperature 100 oscillates according to the dynamic target temperature range 130. The dynamic target temperature range 130 is defined by the minimum target temperature 140 and the maximum target temperature 150. The minimum target temperature 140 and maximum target temperature 150, as well as one or more intermediate target temperatures, control the heat-up or cool-down rate of the seat. Therefore, the seat heating unit can be controlled such that the seat temperature 100 oscillates, more specifically, within the minimum target temperature 140 and the maximum target temperature 150. By oscillating the temperature 100 of the vehicle seat within the dynamic target temperature range 130, thereby producing a "thermal wave" effect, human thermal sensation can be enhanced in response to the continually oscillating temperatures. Moreover, the dynamic target temperature range 130 may be changed automatically (in real-time) in response to interior climate changes in order to improve user comfort and reduce energy consumption.

The minimum target temperature 140 and maximum target temperature 150 values may be set according to an active seat heating mode, as explained further below. Moreover, the minimum target temperature 140 and the maximum target temperature 150 may have a corresponding tolerance range 160, respectively. The tolerance range 160 represents a temperature range (e.g., +/−1 or 2 degrees) in which it may be permissible for the seat temperature 100 to reach beyond the minimum and maximum target temperatures. As such, the minimum target temperature 140 and maximum target temperature 150 may be defined as the lower and upper limit, respectively, of their corresponding tolerance range 160. That is, the minimum target temperature 140 may be the lower limit of its respective tolerance range 160, and similarly, the maximum target temperature 150 may be the upper limit of its respective tolerance range 160. Alternatively, the minimum target temperature 140 and maximum target temperature 150 may be defined without regard to their respective tolerance ranges.

The thermal wave-based seat heating system may operate according to multiple predefined seat heating modes 170. Each seat heating mode 170 may correspond to a unique dynamic target temperature range 130, respectively. Moreover, the dynamic target temperature range 130 for each seat heating mode 170 may be established to achieve a particular objective. For instance, as shown in FIG. 1, the seat heating modes 170 may include: a first seat heating mode that is an initial heating mode where the vehicle interior conditions are not yet comfortable, in which the minimum target temperature 140 and the maximum target temperature 150 are initially defined as substantially equivalent to the target temperature 120 for the seat of the vehicle and the seat is initially heated toward the target temperature 120; a second seat heating mode that is a thermal sensation mode where vehicle interior conditions are improving, in which the maximum target temperature 150 is substantially equivalent to the target temperature 120, the minimum target temperature 140 is less than the maximum target temperature 150, and the seat temperature oscillates between the target temperature 120 and a lower temperature in order to achieve a "thermal wave" effect and induce warm sensations for the user; and a third seat heating mode that is an energy savings mode where vehicle interior conditions are nearly optimal, in which the maximum target temperature 150 is less than the target temperature 120, the minimum target temperature 140 is less than the maximum target temperature 150, and the seat temperature oscillations are less frequent, thus producing warm sensations for the user while saving energy by reducing the amount of time that the seat heating unit is powered on. It should be understood that the seat heating modes described above and shown in FIG. 1 are for demonstration purposes only and do not limit the scope of the seat heating modes disclosed herein. Rather, the seat heating modes can be associated with a dynamic target temperature range 130 that is defined in any suitable manner.

Particular seat heating modes 170 may be activated based on the interior climate of the vehicle (e.g., interior temperature 110). To this end, a climate sensor (e.g., a thermocouple or other suitable sensor) installed in the vehicle can sense an attribute or ambient condition of the interior climate, including but not limited to the interior temperature and interior humidity. The interior climate attribute could also refer to an operation state of the vehicle's heating-ventilation-air conditioning (HVAC) system. Then, a particular seat heating mode 170 may be activated in response to a change of the interior climate of the vehicle. For instance, a seat heating mode 170 may be activated when a sensed attribute of the interior climate satisfies a predefined trigger condition. As an example, a trigger condition may be satisfied when a value of the sensed attribute is greater than or equal to a predefined value.

As shown in FIG. 1, two trigger temperatures are defined: $TT_1$ and $TT_2$. While the interior of the vehicle is warming, once the interior temperature 110 of the vehicle reaches trigger temperatures $TT_1$ or $TT_2$, a different seat heating mode 170 may be activated. When a different (or "new") seat heating mode 170 is activated, at least one of the minimum target temperature 140 and maximum target temperature 150 may be adjusted in accordance with the dynamic target temperature range 130 associated with the different seat heating mode. For instance, as the interior temperature 110 continues to rise, the dynamic target temperature range 130 can be reduced, so as to not overheat the user, to decrease energy consumption, etc.

Figure 2:
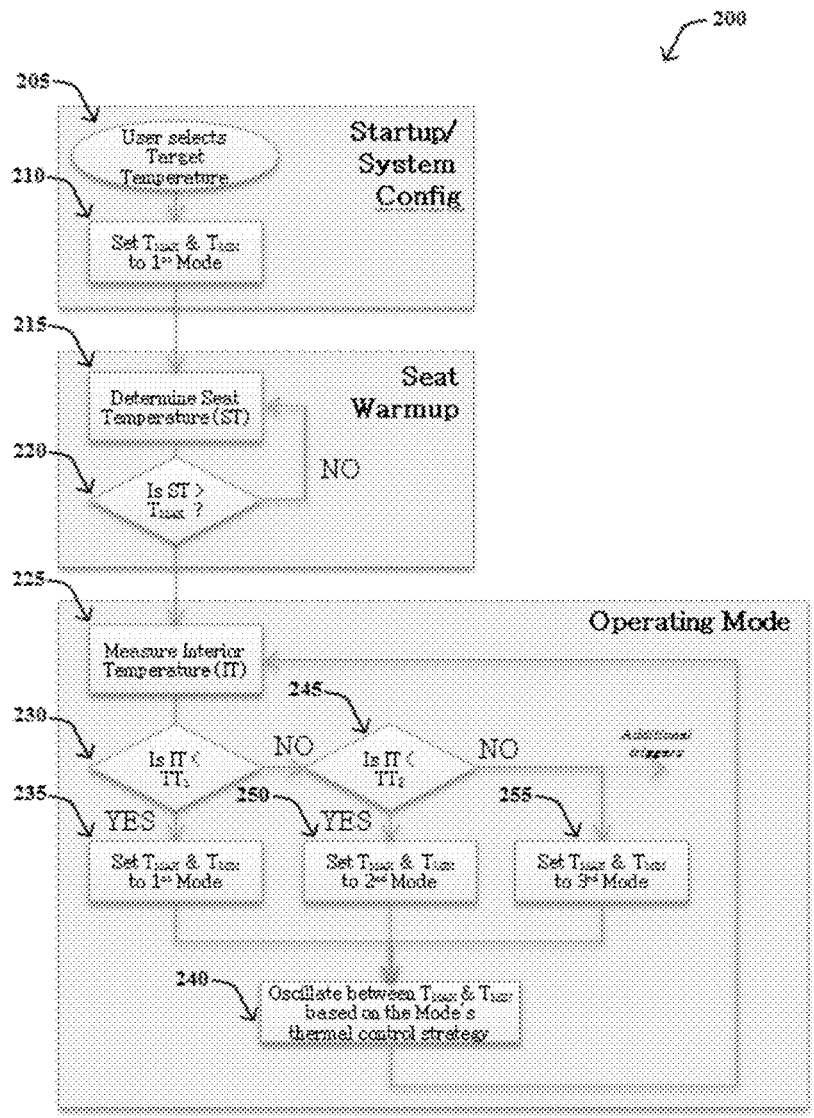
FIG. 2 illustrates an example simplified procedure for operating a thermal wave-based seat heating system.

FIG. 2 illustrates an example simplified procedure for operating a thermal wave-based seat heating system. The procedure 200 may start at step 205, and continue to step 210, where, as described in greater detail herein, the thermal wave-based seat heating system may operate according to the depicted logic.

At step 205, the seating heating unit is activated as a user selects the target temperature 120 by, for example, pressing a button mounted in the vehicle interior, selecting a heating level (e.g., "high" or "low"), etc. Upon activation, at step 210, the minimum target temperature 140 ($T_{MIN}$) and maximum target temperature 150 ($T_{MAX}$) can be set according to the active seat heating mode 170. For instance, upon activation of the seat heating unit, a first seat heating mode that is an initial heating mode may be activated. Thus, the minimum target temperature 140 and maximum target temperature 150 may be set (or reset, if necessary) according to the first seat heating mode, such that the minimum target temperature 140 and maximum target temperature 150 are substantially equivalent to the target temperature 120.

As the vehicle seat is warming up, the temperature 100 of the seat is determined, at step 215. The seat temperature 100 may refer to a surface temperature of the seat. The seat temperature may be calculated, for example, based on values measured by a thermal couple. A goal is to have the seating surface eventually experience "thermal wave" conditions. To this end, at step 220, it is determined whether the seat temperature 100 is greater than or equal to the maximum target temperature 150 ($T_{MAX}$). If not, the temperature 100 of the seat is continually determined until the seat temperature 100 reaches the maximum target temperature 150. When the seat temperature 100 is greater than or equal to the maximum target temperature 150, the seat heating unit can be controlled such that the seat temperature oscillates according to the dynamic target temperature range associated with the active seat heating mode. During activation of the initial seat heating mode, where the minimum target temperature 140 and maximum target temperature 150 are set as substantially equivalent to the target temperature 120, the seat temperature 100 may oscillate within the upper and lower limits of respective tolerance ranges 160 of the minimum target temperature 140 and maximum target temperature 150. Effectively, is a single temperature target is utilized in this seat heating mode (since the minimum and maximum target temperatures are substantially equivalent to one another), whereas two or more temperature targets are utilized in other seat heating modes.

After the seat has warmed up to the target temperature 120, an attribute of the interior vehicle climate is measured, at step 225. For instance, as shown in FIG. 2, the temperature 110 of the vehicle interior can be measured. At step 230, the interior temperature 110 is compared to a first predefined trigger temperature $TT_1$. If the interior temperature 110 is less than the trigger temperature $TT_1$, the seat heating unit can be controlled such that the seat temperature 100 oscillates between the minimum target temperature 140 and maximum target temperature 150 which are defined based on the activated seat heating mode (i.e., first/initial seat heating mode), at step 240. Then, the operating loop continues as the interior temperature 110 is measured once again at step 225.

Conversely, if the interior temperature 110 is greater than or equal to the trigger temperature $TT_1$, the interior temperature 110 is next compared to a second predefined trigger temperature $TT_2$, at step 245. If the interior temperature 110 is less than the trigger temperature $TT_2$, a new seat heating mode 170 is activated. For instance, a second seat heating mode that is a thermal sensation mode where vehicle interior conditions are improving can be activated. Additionally, the minimum target temperature 140 ($T_{MIN}$) and maximum target temperature 150 ($T_{MAX}$) can be set and/or adjusted according to the second seat heating mode, as shown in FIG. 2 at step 250. For instance, the maximum target temperature 150 may be set as substantially equivalent to the target temperature 120, and the minimum target temperature 140 may be set as less than the maximum target temperature 150, in accordance with the second seat heating mode. Thus, the seat temperature 100 can oscillate between the target temperature 120 and a lower temperature in order to achieve a "thermal wave" effect and induce warm sensations for the user, at step 240.

As the vehicle interior continues to warm, if the interior temperature 110 is greater than or equal to the trigger temperature $TT_2$, the interior temperature 110 is next compared to additional predefined trigger temperatures. Any amount and type of trigger conditions or factors may be defined in order to customize the oscillation activity of the seat temperature 100. Demonstrative trigger temperatures and dynamic target temperature ranges 130 are illustrated in FIG. 3. Moreover, at step 255, a new seat heating mode 170 is activated. For instance, a third seat heating mode that is an energy savings mode where vehicle interior conditions are nearly optimal can be activated. Additionally, the minimum target temperature 140 (T$_{MIN}$) and maximum target temperature 150 (T$_{MAX}$) can be set and/or adjusted according to the third seat heating mode, as shown in FIG. 2 at step 255. For instance, the maximum target temperature 150 may be set as less than the target temperature 120, and the minimum target temperature 140 may be set as less than the maximum target temperature 150. Thus, the oscillations of the seat temperature 100 may be less frequent, thus continuing to produce warm sensations for the user while saving energy by reducing the amount of time that the seat heating unit is powered on, at step 240.

The procedure 200 illustratively ends once the seat heating unit has been deactivated. The techniques by which the steps of procedure 200 may be performed, as well as ancillary procedures and parameters, are described in detail herein.

It should be noted that the steps shown in FIG. 2 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Even further, the illustrated steps may be modified in any suitable manner in accordance with the scope of the present claims.

FIG. 3 illustrates an example table of values associated with thermal wave-based seat heating modes. All values in the example table 300 may be predefined and/or adjusted in order to customize operation of the thermal wave-based seat heating system. Therefore, the values depicted in FIG. 3 are for demonstration purposes only and do not limit the scope of the present disclosure. As shown in FIG. 3, the example table 300 includes a first seat heating mode that is a seat warming mode, a second seat heating mode that is a thermal sensation mode, and a third seat heating mode that is an energy savings mode. The example table 300 further includes trigger temperatures associated with the seat heating modes 170. As explained above, when the temperature 110 of the vehicle interior reaches a predefined trigger temperature, a new seat heating mode may be activated. Similarly, the dynamic target temperature range 130 may change by adjusting one or more of the minimum target temperature 140 and maximum target temperature 150, according to the activated seat heating mode 170.

In a vehicle seat heating system with multiple heating levels (e.g., "high," "medium," and "low"), multiple dynamic target temperature ranges 130 can be established in association with each heating level. That is, the minimum target temperature 140 and maximum target temperature 150 for each seat heating mode 170 may vary according to the particular heating level. For instance, as shown in FIG. 3, in the first seat heating mode, the maximum target temperature 150 is 43 degrees C. when turned on "high," whereas the maximum target temperature 150 is 36 degrees C. when turned on "low."

Additionally, the example table 300 includes seat temperature change time limit values 180. The time limit values 180 define the minimum frequency of the temperature oscillations of the seat by denoting the amount of time that the seat temperature 100 is either warmed/increased toward the maximum target temperature 150 or cooled/decreased toward the minimum target temperature 140. When the time limit 180 is smaller, as in the case of the first seat heating mode shown in FIG. 3 (e.g., 1 second or less), the seat temperature oscillations are more frequent. That is, fluctuations of the seat temperature 100 may be less pronounced, and the seat temperature 100 stays relatively constant with respect to the target temperature 120 (while still oscillating). In contrast, when the time limit 180 is greater, as in the case of the third seat heating mode shown in FIG. 3 (e.g., 6 seconds or less), the seat temperature oscillations are less frequent. That is, fluctuations of the seat temperature 100 may be more pronounced, causing warm sensations to be experienced by the user, while maximizing energy savings.

Notably, because of varying time seat temperature change time limits 180 associated with each seat heating mode 170, the waveform of seat temperature oscillations can be controlled. In other words, the shape of the temperature oscillations of the seat can be controlled based on the time limit values 180. For instance, as the time limit 180 decreases (e.g., in the case of the first seat heating mode, as shown in FIG. 1), the period of the seat temperature oscillations is decreased, causing the wavelength to decrease, and the wave frequency to increase. Conversely, as the time limit 180 increases (e.g., in the case of the third seat heating mode, as shown in FIG. 1), the period of the seat temperature oscillations is increased, causing the wavelength to increase, and the wave frequency to decrease. Accordingly, the waveform of temperature oscillations of the seat can be controlled.

Additionally, the time limits 180 may change according to whether the seat temperature 100 is heating or cooling. That is, the time limit 180 may define a heating time limit (time limit$_{HEAT}$) that denotes an amount of time for which the seat temperature is heated toward the maximum target temperature 150 and a cooling time limit (time limit$_{COOL}$) that denotes an amount of time for which the seat temperature is cooled toward the minimum target temperature 140. Further, the heating time limit, otherwise referred to herein as a "heating duration," may be different than (or the same as) the cooling time limit, otherwise referred to herein as a "cooling duration." By utilizing dissimilar heating and cooling time limits (e.g., defining the heating time limit to be less than the cooling time limit), the waveform of seat temperature oscillations can be further changed, as explained in further detail with respect to FIG. 6.

Figure 4:
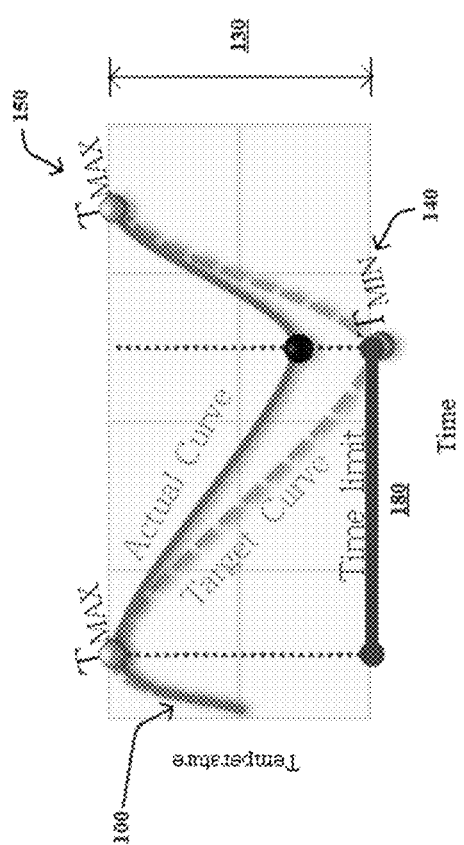
FIG. 4 illustrates an example graphical representation of a seat cooling curve and cooling time limit.

FIG. 4 illustrates an example graphical representation of a seat cooling curve and cooling time limit. As shown in FIG. 4, after reaching the maximum target temperature 150 (T$_{MAX}$), the seat heating unit may be controlled such that the seat temperature 100 is cooled for a cooling time limit (e.g., cooling duration) 180. That is, the seat temperature 100 is decreased toward the minimum target temperature 140 (T$_{MIN}$) for the time limit 180.

Once the cooling time limit 180 has been reached, the seat heating unit may be controlled such that the seat is warmed again, thereby producing temperature oscillations. Consequently, it is possible that the cooling time limit 180 is reached (i.e., expiration of the time limit 180) before the seat temperature 100 reaches the minimum target temperature 140. The converse may be true as well, i.e., the heating time limit 180 may be reached before the seat temperature 100 reaches the maximum target temperature 150. This scenario is demonstrated in FIG. 4, where a target cooling curve from the maximum target temperature 150 to the minimum target temperature 140 is shown, in contrast to an actual cooling curve from the maximum target temperature 150 to a temperature level greater than the minimum target temperature 140. In other words, while being cooled, the seat temperature 100 does not reach the minimum target temperature 140 prior to the cooling time limit 180 being reached. In such a case, the seat heating unit may be controlled (e.g., turned on) such that the seat is heated once the cooling time limit 180 is reached, even if the seat temperature 100 did not reach the minimum target temperature 140. That is, the thermal waves can continue at the minimum frequency, as defined by the time limit 180, even if the seat temperature 100 does not reach the minimum or maximum target temperatures.

Figure 5:
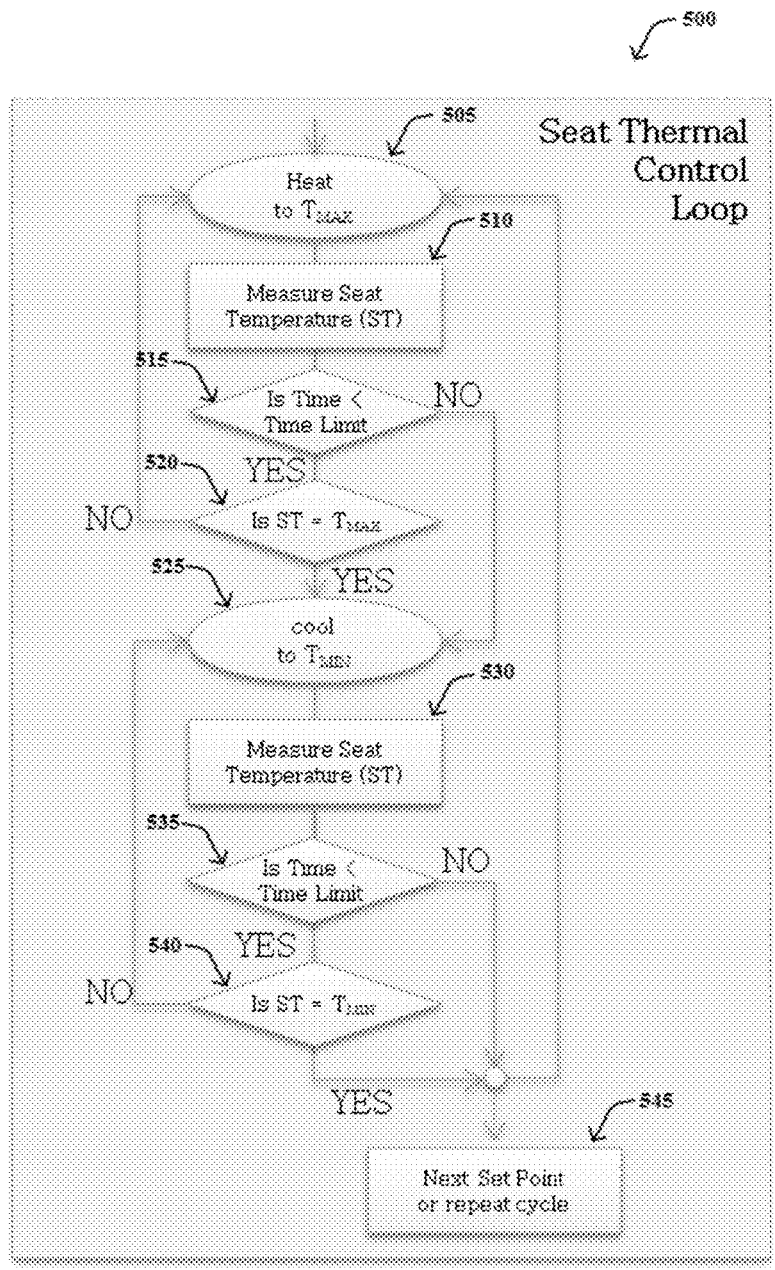
FIG. 5 illustrates an example simplified procedure for operating a thermal control loop in a thermal wave-based seat heating system.

In this regard, FIG. 5 illustrates an example simplified procedure for operating a thermal control loop in a thermal wave-based seat heating system. The procedure 500 may start at step 505, and continue to step 510, where, as described in greater detail above, a thermal control loop is operated in order to maintain a minimum frequency of thermal waves.

At step 505, the seat heating unit may be controlled such that the seat is heated toward the maximum target temperature 150 ($T_{MAX}$). At step 510, the seat temperature 100 may be measured (e.g., using a thermocouple) and compared to the maximum target temperature 150 (step 520). Additionally, a clock-like mechanism may be used to track the current time elapsed while heating (or cooling) the vehicle seat. The clock may be reset whenever a new heating/cooling process begins. At step 515, the current time is compared to the time limit 180 (i.e., heating time limit). If the current time is less than the time limit 180 (i.e., the time limit 180 has not been reached), the seat temperature 100 is compared to the maximum target temperature 150, at step 520. If the seat temperature 100 is less than the maximum target temperature 150, the seat continues to be heated by the seat heating unit, at step 505. On the other hand, if the seat temperature 100 reaches the maximum target temperature 150, the heating process is complete, and the cooling process then begins, at step 525. However, if the current time is greater than or equal to the time limit 180, at step 515, the heating process is complete, and the cooling process then begins, at step 525, even if the maximum target temperature 150 is not reached.

The cooling process begins at step 525, where the seat heating unit may be controlled such that the seat is cooled toward the minimum target temperature 140 ($T_{MIN}$). At step 530, the seat temperature 100 may be measured and compared to the minimum target temperature 140 (step 540). Additionally, after resetting the clock upon completion of the heating process, the current time may be compared to the time limit 180 (i.e., cooling time limit), at step 535. If the current time is less than the time limit 180 (i.e., the time limit 180 has not been reached), the seat temperature 100 is compared to the minimum target temperature 140, at step 540. If the seat temperature 100 is greater than the minimum target temperature 140, the seat continues to be cooled by the seat heating unit, at step 525. On the other hand, if the seat temperature 100 reaches the minimum target temperature 140, the cooling process is complete, and the heating process begins once again, at step 545. This way, the "thermal wave" effect is achieved in the vehicle seat by generating continuous oscillations of the seat temperature 100. However, if the current time is greater than or equal to the time limit 180, at step 535, the cooling process is complete, and the heating process begins once again, at step 545, even if the minimum target temperature 140 is not reached.

The procedure 500 illustratively ends once the seat heating unit has been deactivated. The techniques by which the steps of procedure 500 may be performed, as well as ancillary procedures and parameters, are described in detail herein.

It should be noted that the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Even further, the illustrated steps may be modified in any suitable manner in accordance with the scope of the present claims.

Figure 6:
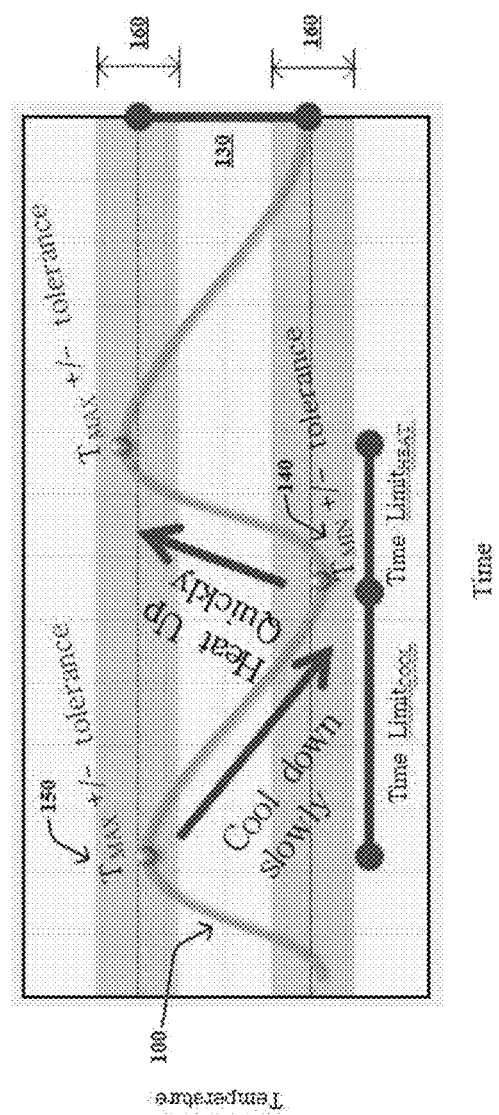
FIG. 6 illustrates an example graphical representation of varying seat heating and cooling curves and heating and cooling time limits.

FIG. 6 illustrates an example graphical representation of varying seat heating and cooling curves and heating and cooling time limits. As shown in FIG. 6, the seat temperature oscillation waveform may be controlled by varying the heating time limit (time limit$_{HEAT}$) and cooling time limit (time limit$_{COOL}$). As described above, the time limit 180 may define a heating time limit that denotes an amount of time for which the seat temperature is heated toward the maximum target temperature 150 and a cooling time limit that denotes an amount of time for which the seat temperature is cooled toward the minimum target temperature 140. Further, the heating time limit, otherwise referred to herein as a "heating duration," may be different than (or the same as) the cooling time limit, otherwise referred to herein as a "cooling duration."

For instance, as shown in FIG. 6, the cooling time limit may be defined as greater than the heating time limit. That is, the vehicle seat is cooled for an amount of time greater than an amount of time for which the vehicle seat is heated. As a result, the oscillation waveform can adopt a "sawtooth"-like shape, as shown in FIG. 6, where the thermal wave increases in temperature quickly to enhance the sensation of heat, then decreases slowly. Under this approach, the relatively fast increase in temperature should be noticeable and pleasant to the user, while the slow decrease in temperature will be less noticeable. Accordingly, adjusting the heating and cooling time limits independently of one another is one option for customization of the temperature oscillation waveform.

Figure 7A:
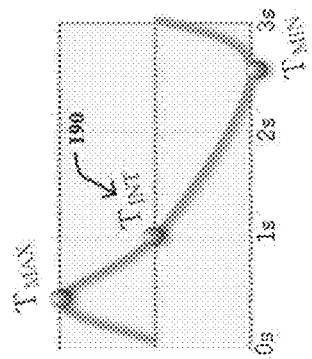
FIGS. 7A-7C illustrate example graphical representations of variable temperature oscillation waveforms.
Figure 7B:
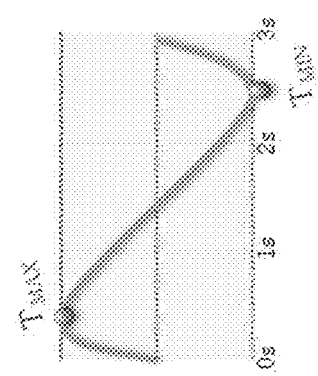
Figure 7C:
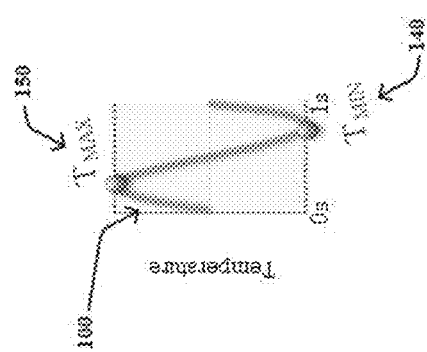

Another option for customization of the temperature oscillation waveform involves defining additional target temperatures, i.e., intermediate target temperatures, within the dynamic target temperature range 130. To this point, FIGS. 7A-7C illustrate example graphical representations of variable temperature oscillation waveforms. As shown in FIGS. 7A-7C, the seat heating unit is controlled such that the seat temperature 100 oscillates within the minimum target temperature 140 ($T_{MIN}$) and maximum target temperature 150 ($T_{MAX}$), yet the heating and cooling time limits and the number of target temperatures vary. For instance, in FIG. 7A, the cooling time limit 180 is relatively small, causing the period of the oscillation waveform to be small and the wave frequency to increase. This way, seat temperature oscillations are more frequent. Conversely, in FIG. 7B, the cooling time limit 180 is relatively large, causing the period of the oscillation wave form to be large and the wave frequency to decrease. This way, seat temperature oscillations are less frequent.

As shown in FIG. 7C, however, an additional target temperature can be defined to further shape the oscillation waveform. Specifically, in FIG. 7C, an intermediate target temperature 190 is defined such that, during the cooling process, the seat temperature 100 decreases from the maximum target temperature 150 to the intermediate target temperature 190, and then decreases further from the intermediate target temperature 190 toward the minimum target temperature 140. The intermediate target temperature 190 may be defined such that the seat temperature 100 passes therethrough during the cooling process, as shown in FIG. 7C, during the heating process, or both. Multiple intermediate target temperatures 190 may defined in order to shape the oscillation waveform as desired. Similarly, time limits between any combination of maximum target temperature 150, minimum target temperature 140, and intermediate target temperatures 190 may be defined in order to further shape the oscillation waveform as desired.

Accordingly, techniques are described herein that provide a vehicle seat heater that uses controlled oscillations between multiple independently controlled temperature targets. Oscillating the seat temperature is important because human thermal receptors adapt and become desensitized to static thermal conditions. Delivering waves of temperature creates a continuously changing thermal condition where the receptors do not become desensitized. Results include enhanced comfort and satisfaction among vehicle users, as well as reduced energy usage since the seat heating unit is frequently powered down to produce the desired oscillations.

While there have been shown and described illustrative embodiments that provide for thermal wave-based seat heating, it is to be understood that various other adaptations and modifications may be made within the spirit and scope of the embodiments herein. For example, the embodiments have been primarily shown and described herein with relation to seats in a vehicle. However, the embodiments in their broader sense are not as limited. Rather, the techniques disclosed herein may be applied to any suitable environment where seat heating units are utilized. Similarly, the embodiments have been primarily shown and described herein with relation to an ambient temperature of the vehicle cabin. However, operation of the thermal wave-based heating system disclosed herein may depend on any suitable climate attribute. Generally speaking, the embodiments of the present disclosure may be modified in any suitable manner in accordance with the scope of the present claims.

The foregoing description has been directed to embodiments of the present disclosure. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   establishing a dynamic target temperature range for a seat of a vehicle having a seat heating unit installed therein, the dynamic target temperature range defined by an adjustable minimum and maximum target temperature;
   activating a seat heating mode of multiple predefined seat heating modes based on an interior climate of the vehicle;
   defining the minimum target temperature, the maximum target temperature, and a wavelength time limit according to the activated seat heating mode; and
   controlling the seat heating unit such that a temperature of the seat continuously oscillates with a waveform that is bounded in amplitude by the defined minimum target temperature and the defined maximum target temperature without overlapping tolerances of each of the defined minimum target temperature and the defined maximum target temperature, and bounded in wavelength by the wavelength time limit,
   wherein the dynamic target temperature range or the wavelength time limit at any one seat heating mode differs from that at another seat heating mode, and
   wherein at least one complete oscillation occurs in the activated seat heating mode.

2. The method of claim 1, further comprising:
   activating a second seat heating mode of the multiple seat heating modes in response to a change of the interior climate of the vehicle; and
   adjusting at least one of the minimum target temperature and the maximum target temperature according to the second seat heating mode.

3. The method of claim 1, wherein the minimum target temperature and the maximum target temperature have a corresponding tolerance range, respectively.

4. The method of claim 3, wherein:
   the minimum target temperature is a lower limit of the tolerance range corresponding to the minimum target temperature, and
   the maximum target temperature is an upper limit of the tolerance range corresponding to the maximum target temperature.

5. The method of claim 1, further comprising:
   sensing an attribute of the interior climate of the vehicle, wherein the sensed attribute involves an interior temperature or an interior humidity of the vehicle.

6. The method of claim 5, further comprising:
   activating a second seat heating mode of the multiple seat heating modes when the attribute of the interior climate of the vehicle satisfies a predefined trigger condition.

7. The method of claim 6, wherein the predefined trigger condition is satisfied when a value of the attribute of the interior climate of the vehicle is greater than or equal to a predefined value.

8. The method of claim 1, wherein the multiple seat heating modes correspond to a unique dynamic target temperature range, respectively.

9. The method of claim 1, wherein the multiple seat heating modes include:
   a first seat heating mode in which the maximum target temperature is substantially equivalent to the target temperature, and the minimum target temperature is less than the maximum target temperature, and
   a second seat heating mode in which the maximum target temperature is less than the target temperature, and the minimum target temperature is less than the maximum target temperature.

10. The method of claim 1, further comprising:
    controlling a waveform of temperature oscillations of the seat.

11. The method of claim 10, wherein the controlling of the waveform comprises: defining a heating duration and a cooling duration; and
    controlling the seat heating unit such that the temperature of the seat continuously oscillates by i) increasing toward the maximum target temperature for the heating duration and ii) decreasing toward the minimum target temperature for the cooling duration.

12. The method of claim 11, wherein the cooling duration is greater than the heating duration.

13. The method of claim 10, wherein the controlling of the waveform comprises: defining an intermediate target temperatures within the dynamic target temperature range; and
    controlling the seat heating unit such that the temperature of the seat continuously oscillates by i) increasing toward the maximum target temperature, ii) decreasing toward the intermediate target temperature, and iii) decreasing from the intermediate target temperature toward the minimum target temperature.

14. The method of claim 10, wherein the controlling of the waveform comprises: defining an intermediate target temperatures within the dynamic target temperature range; and controlling the seat heating unit such that the temperature of the seat continuously oscillates by i) increasing toward the intermediate target temperature, ii) increasing from the intermediate target temperature toward the maximum target temperature, and iii) decreasing toward the minimum target temperature.

15. The method of claim 1, further comprising:
defining one or more intermediate target temperatures within the dynamic target temperature range; and
controlling the seat heating unit such that the temperature of the seat continuously oscillates according to the one or more intermediate target temperatures.

16. The method of claim 1, further comprising:
determining a target temperature for the seat of the vehicle.

17. The method of claim 16, wherein the target temperature is determined based on input received from a user of the vehicle.

18. The method of claim 16, further comprising:
initially establishing the dynamic target temperature range with respect to the target temperature.

19. The method of claim 18, wherein the minimum target temperature and the maximum target temperature are defined as substantially equivalent to the target temperature when the dynamic target temperature range is initially established.

20. The method of claim 1, wherein the temperature of the seat is a surface temperature of the seat.

* * * * *